United States Patent [19]

Hakner

[11] 4,266,516
[45] May 12, 1981

[54] INTERNAL COMBUSTION ROTARY ENGINE

[76] Inventor: Robert Hakner, 2050 21st Dr., Brooklyn, N.Y. 11214

[21] Appl. No.: 21,832

[22] Filed: Mar. 19, 1979

[51] Int. Cl.³ ............................................. F02B 53/00
[52] U.S. Cl. ................................... 123/241; 418/270
[58] Field of Search ............ 123/222, 229, 228, 241, 123/242; 418/186, 270

[56] References Cited

U.S. PATENT DOCUMENTS

| 3,289,654 | 12/1966 | Geiger | 123/241 |
| 3,314,401 | 4/1967 | Kell | 123/242 |
| 3,349,757 | 10/1967 | Artajo | 418/270 |
| 3,387,596 | 6/1968 | Niemand | 123/241 X |
| 3,442,257 | 5/1969 | Walker | 123/241 |
| 3,950,174 | 4/1976 | Artajo | 123/241 X |
| 3,996,901 | 12/1976 | Gale et al. | 123/242 |

FOREIGN PATENT DOCUMENTS

| 1551115 | 6/1970 | Fed. Rep. of Germany | 123/241 |
| 1936273 | 1/1971 | Fed. Rep. of Germany | 123/241 |
| 2047732 | 3/1972 | Fed. Rep. of Germany | 123/241 |

*Primary Examiner*—Michael Koczo, Jr.
*Attorney, Agent, or Firm*—Kenyon & Kenyon

[57] ABSTRACT

The disclosure is directed to a rotary engine having an annular housing with at least three internal walls equiangularly disposed about a central axis. At least two sliding pistons are disposed within the housing and in sliding contact with the walls. Two rotating valving assemblies enclose the opposite sides of the sliding pistons so that as the pistons slide, intake and compression chambers are formed. The valving assemblies sequentially provide the charge and exhaust of the engine. The sliding pistons are coupled to a central shaft and provide torque for the shaft.

19 Claims, 27 Drawing Figures

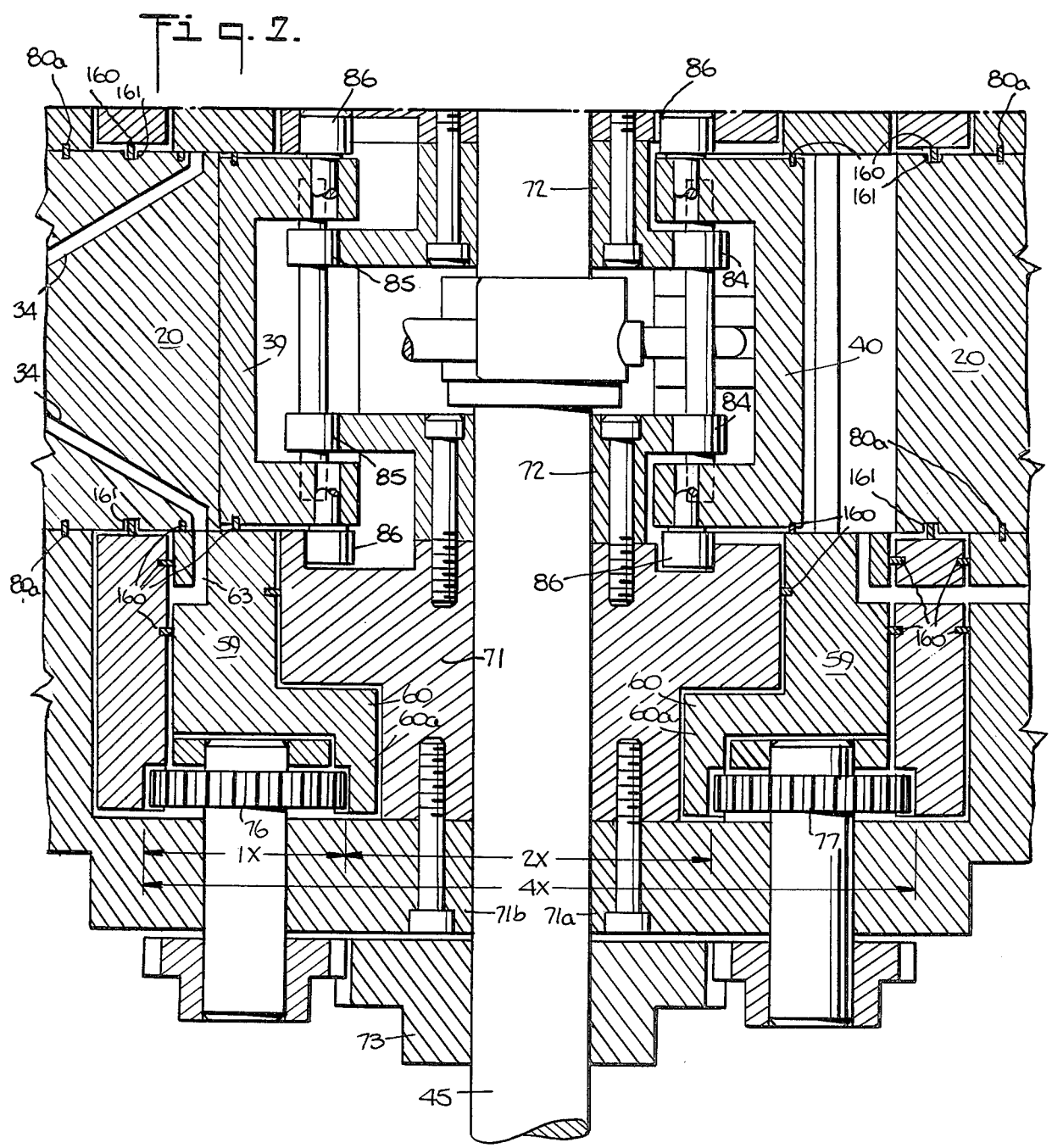

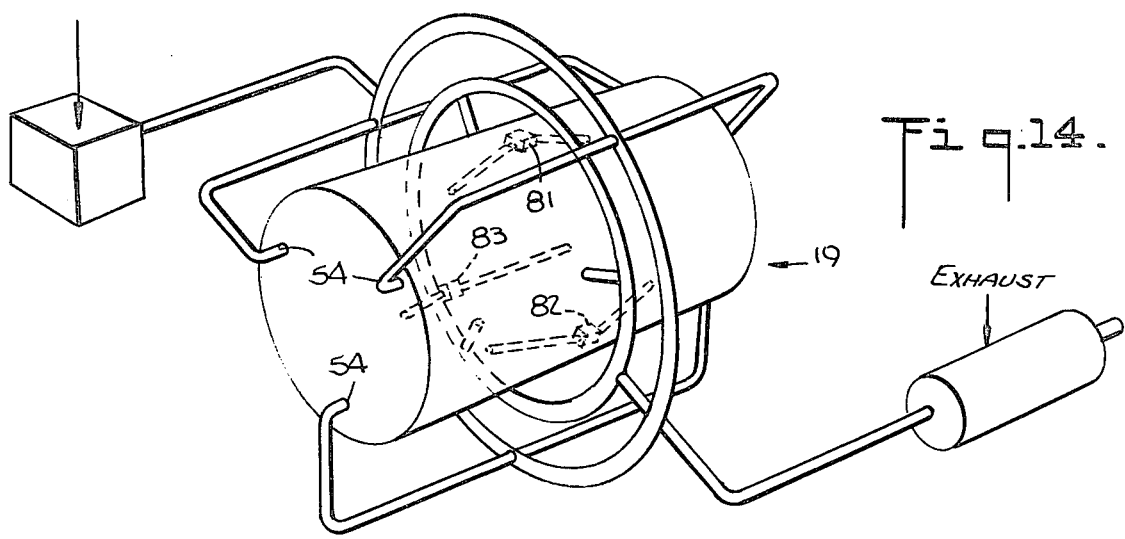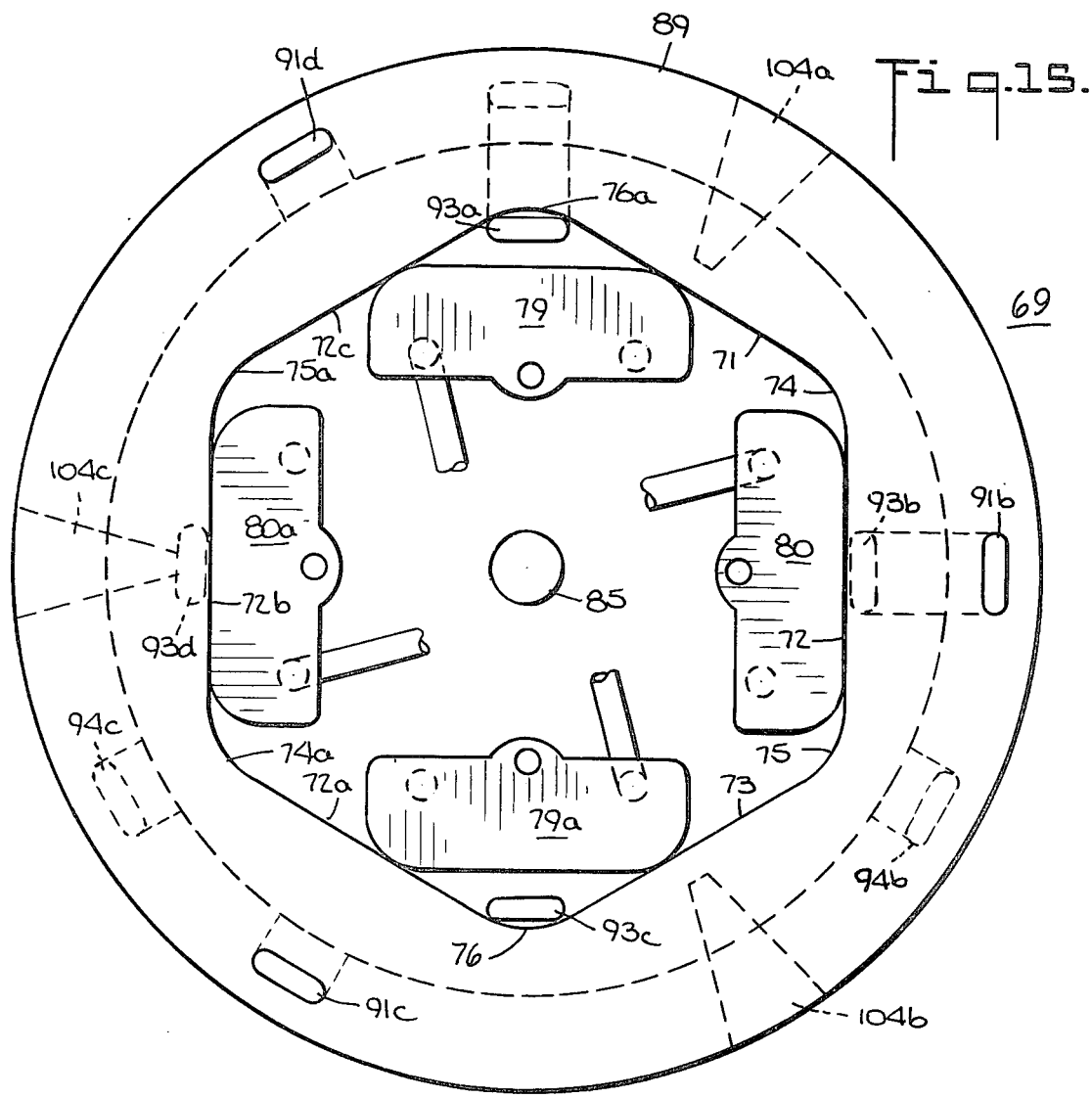

INTERNAL COMBUSTION ROTARY ENGINE

BACKGROUND OF THE INVENTION

The invention relates to the field of rotary piston fluid flow devices in which fluid flow is caused to occur with respect to the device in response to the positive displacement pumping action of a plurality of pistons which move along a rotary path with the outer face portion of each piston adjacent the inner facing surface of the annular housing of the device. More in particular, the invention relates to a rotary piston internal combustion engine in which a charge compressed by a rotary piston is ignited to provide pressured products of combustion. The products of combustion are expanded, thereby providing a rotary driving force to the piston. The connecting of the rotary piston to a drive shaft within the engine causes the rotary piston when subjected to a driving force to apply torque to the engine drive shaft, thereby driving it in rotation. The rotary piston internal combustion engine of the invention has an operating cycle similar to that of a reciprocating piston engine and includes the events of intake, compression, combustion followed by expansion, and exhaust. Specifically, devices with rotary sliding pistons are disclosed in applicant's U.S. Application Ser. No. 851,485, now U.S. Pat. No. 4,144,866, as follows: U.S. Pat No. 3,950,117 which issued on Apr. 13, 1976 to Artajo; U.S. Pat. No. 3,349,757 which issued on Oct. 31, 1967 to Artajo; U.S. Pat. No. 3,289,654 which issued on Dec. 6, 1966 to Geiger; and U.S. Pat. No. 3,442,257 which issued on May 6, 1969 to Walker.

SUMMARY OF THE INVENTION

The invention is directed to a rotary piston fluid flow device and more particularly to an internal combustion rotary piston engine. The engine includes an annular-shaped housing having at least three equiangularly disposed inner walls and at least two rotary sliding pistons. Each piston has an outer face portion that periodically moves adjacent to the inner walls of the housing and oppositely disposed side portions extending inwardly from the outer face portions. The inner walls of the housing intersect in rounded corners. The engine also includes at least one rotating valving assembly disposed at an end face of the housing. The valving assembly covers the side portion of a piston and, in conjunction with the housing and the face portion of the piston, forms a pumping chamber adapted to function as an intake and expansion chamber. The engine includes a combustion system in which combustion commences outside of the pumping chamber. The engine also includes a drive shaft coupled to each sliding piston and means for converting the forces applied to the piston by exploding combustion products to torque applied to the drive shaft. Means for guiding the pistons are also included in the engine to move the sliding pistons with respect to the walls of the housing. Special strip seals maintain the integrity of the chambers formed by the pistons and walls of the housing.

Accordingly it is an object of the invention to provide a rotary piston engine with at least two sliding pistons with the side portions of each piston cooperating in the valving of the engine.

It is another object of the invention to provide a rotary piston engine where the intake and exhaust are facilitated by rotating valving assemblies adjacent to the sides of the housing and the side portions of the pistons.

Another object of the invention is to provide a rotary sliding piston engine in which combustion in a compressed charge of air takes place outside the pumping chamber.

BRIEF DESCRIPTION OF THE DRAWINGS

FIG. 3 is a perspective view of a piston showing an inner face portion and one side portion thereof;

FIG. 7 is a fragmentary vertical cross section view of the engine showing the continuous fluid flow passages;

FIG. 8 is a vertical cross section view of the engine showing cams for controlling the rotary movement of the pistons;

FIG. 14 is an external perspective view of the outer housing and exhaust and intake parts of the engine.

FIG. 15 is a vertical cross section view of an embodiment of the invention having six inner walls and four pistons.

DESCRIPTION OF THE PREFERRED EMBODIMENT

Figure 1:
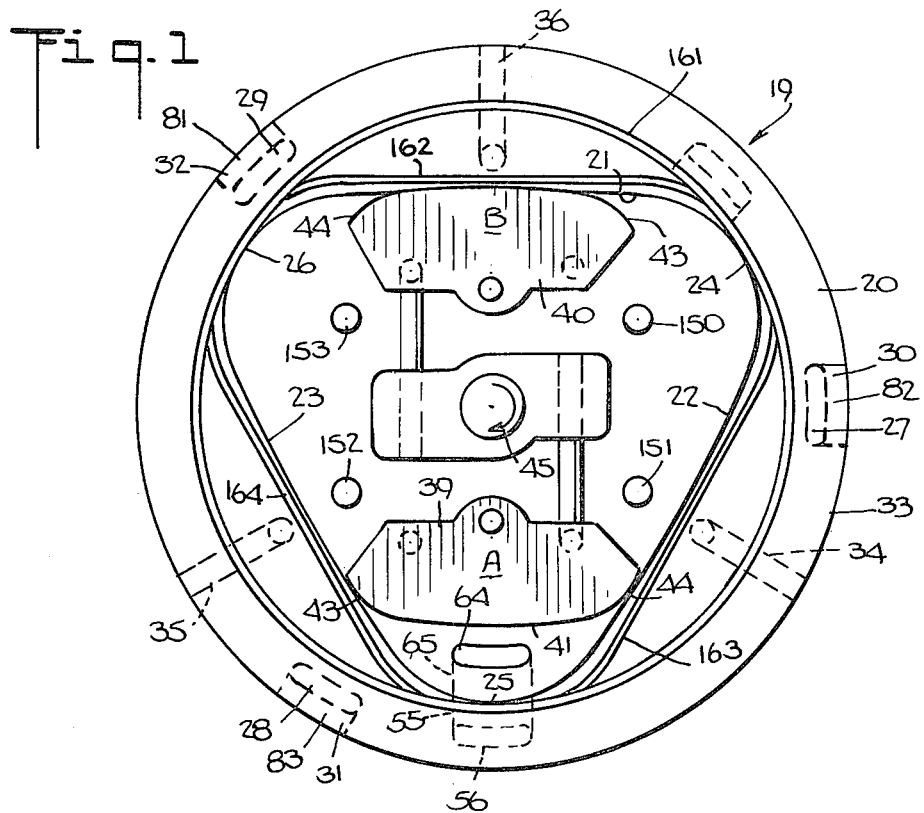
FIG. 1 is a top view of an embodiment of the engine of the invention showing an end surface of the annular housing and the positions of the pistons, and passages with piston A in the completion of the intake position.

As shown in FIGS. 1 and 2, 6 and 7, a rotary piston fluid flow device or engine 19 includes an annular housing 20 having three internal walls 21, 22 and 23, disposed substantially in the form of an equilateral triangle (i.e. equiangularly). Each adjacent pairs of walls 21 and 22, 22 and 23, 23 and 21, intersect at junctions or rounded corners 24, 25 and 26 respectively. The annular housing contains three longitudinal ducts, 27, 28 and 29, each with a duct segment, 30, 31 and 32 respectively, terminating in the periphery 33 of the housing 20. Also included in the annular housing are three pairs of ignition cavities 34, 35 and 36 wherein ignition means such as a spark plug 37, or fuel injection device can be incorporated. The longitudinal ducts 27, 28 and 29 are disposed approximately thirty degrees in a clockwise direction from each adjacent rounded corner 26, 24 and 25, respectively, and the ignition cavities 33, 34 and 35 are oppositely disposed from rounded corners 24, 25 and 26, respectively. The annular housing 20 is made of rigid material that can withstand high temperatures and pressures.

Figure 2:
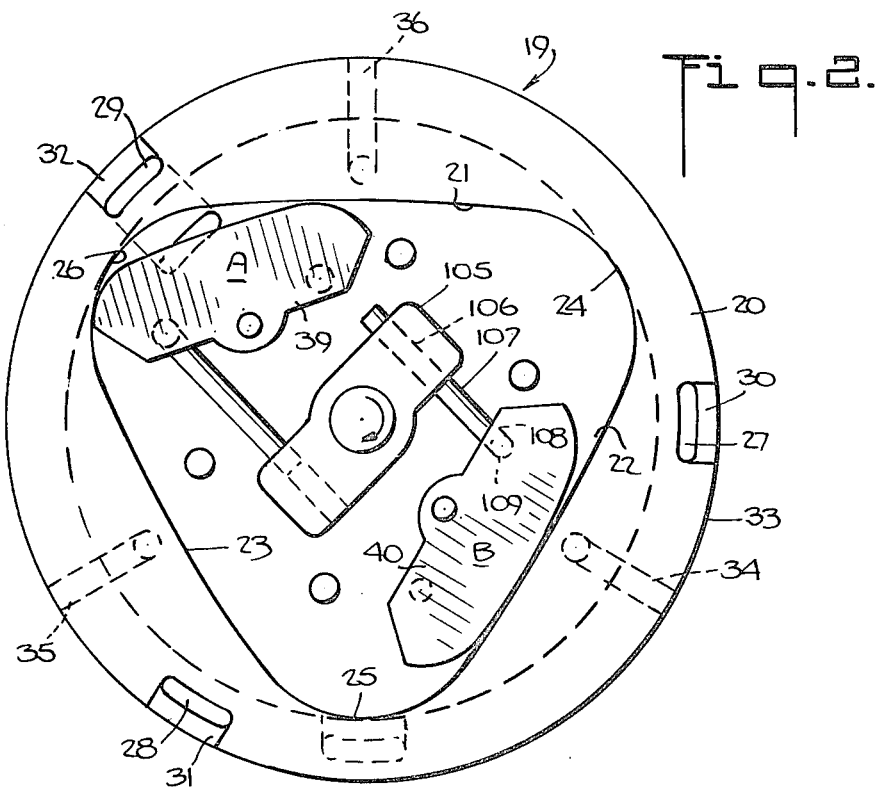
FIG. 2 is a vertical cross section view of the engine showing piston A in the exhaust position.
Figure 2:
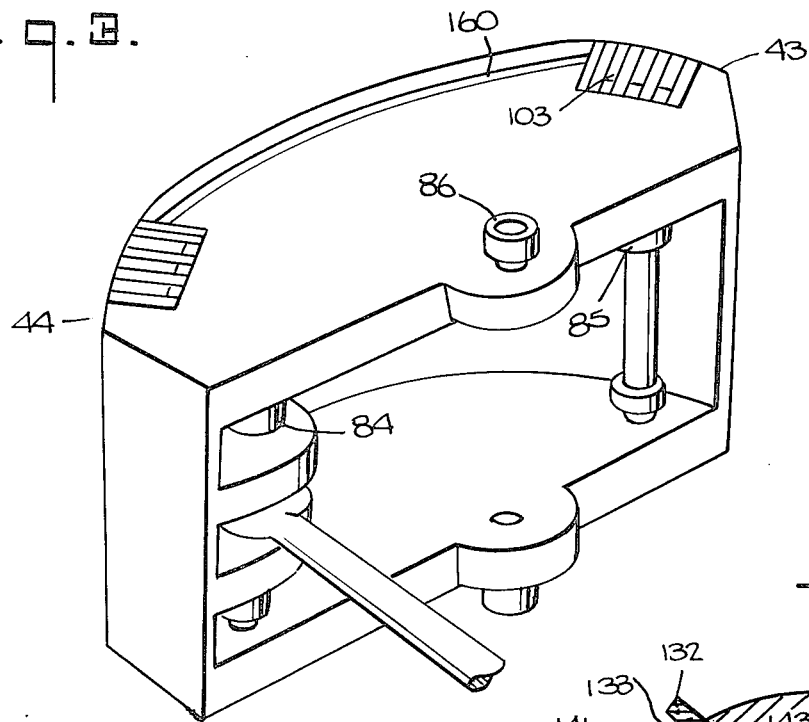
Figure 4:
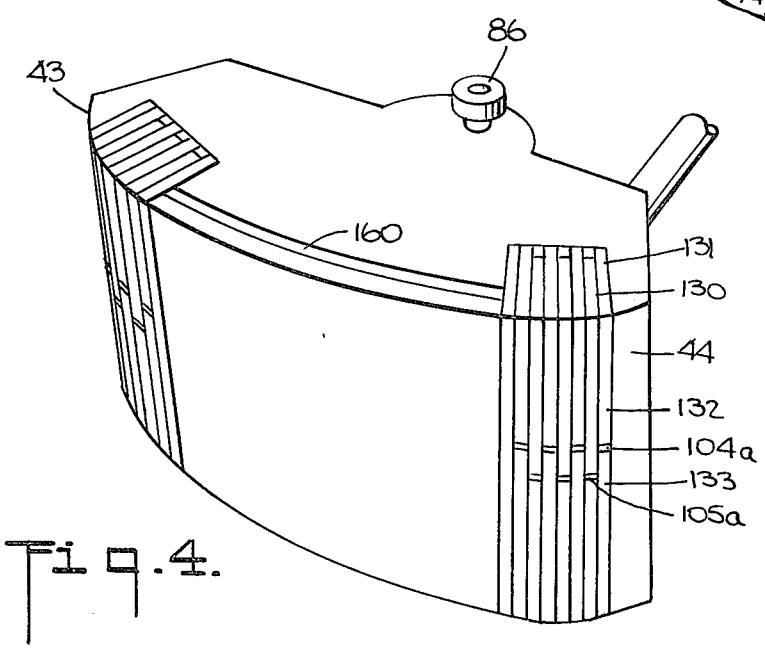
FIG. 4 is a perspective view of the piston showing the face portion, thereof.

Oppositely disposed within the annular housing are two sliding pistons 39 and 40, each having a face portion 41. The face portion 41 of the sliding piston may be concave, substantially flat or convex. As shown in FIGS. 1 and 2, rounded corners 24, 25 and 26 of the housing 20 in conjunction with the face portion 41 of a piston and the walls 21 and 22, form chambers in which intake and expansion can take place. As shown in FIG. 1, rounded corner 25 in conjunction with piston 39 (designated "A") and walls 22 and 23 form a chamber into which is induced a fuel air charge or simply an aircharge if fuel injection is to be employed. The volume of the chamber is controlled by both the radius of curvature of the rounded corner and the form of face 41 of the piston. The face of the piston can be slightly convex as shown in FIGS. 3 and 4, or of other forms such as flattened, concave, etc. Decreasing the radius of curvature of rounded corner increases the volume of the chamber. Flattening or increasing the radius of curvature of the face 41 of the piston also increases the volume of the chamber. Correspondingly, opposite changes can result in a reduced volume for the chamber.

The size and form of the sliding piston 39 may vary in accordance with the size and form of the internal walls 21, 22 and 23. With substantially straight walls, the face portion of the sliding piston may be planar or concave. Alternatively, if the walls have some curvature, the sliding piston may have a planar face portion which would define a compression chamber with the curved section of the wall with which the leading edge 43 and the trailing edge 44 of the piston are in contact.

As shown in FIGS. 3 and 4 the leading edge 43 and trailing edge 44 of each sliding piston 26 may be substantially rounded or cylindrical in form while face portion 41 may be planar or slightly convex in form. Compression is obtained following the forming of an intake chamber when the face of the piston mates with the surface of inner wall. Thus, the mating action forces the charge into the interior of a combustion cavity.

Figures 6A, 6B:
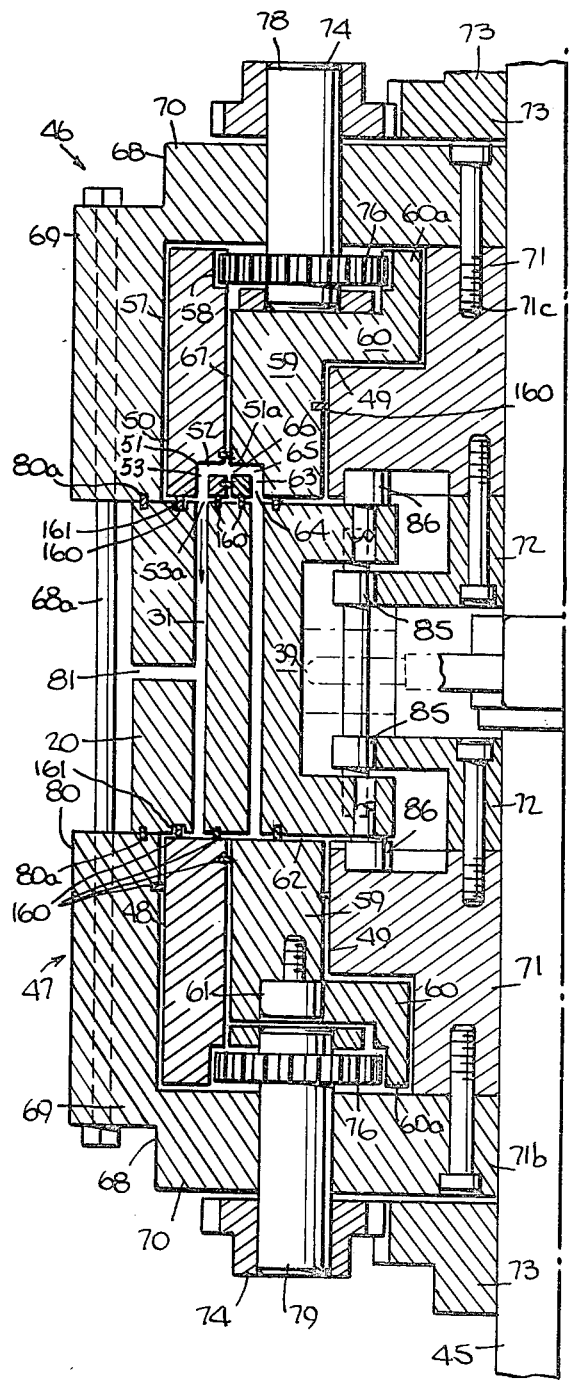
FIG. 6A is a vertical cross section view of the engine showing a piston in an exhaust position.
FIG. 6B is a vertical cross section view of the engine showing a piston in the intake position.
Figure 10:
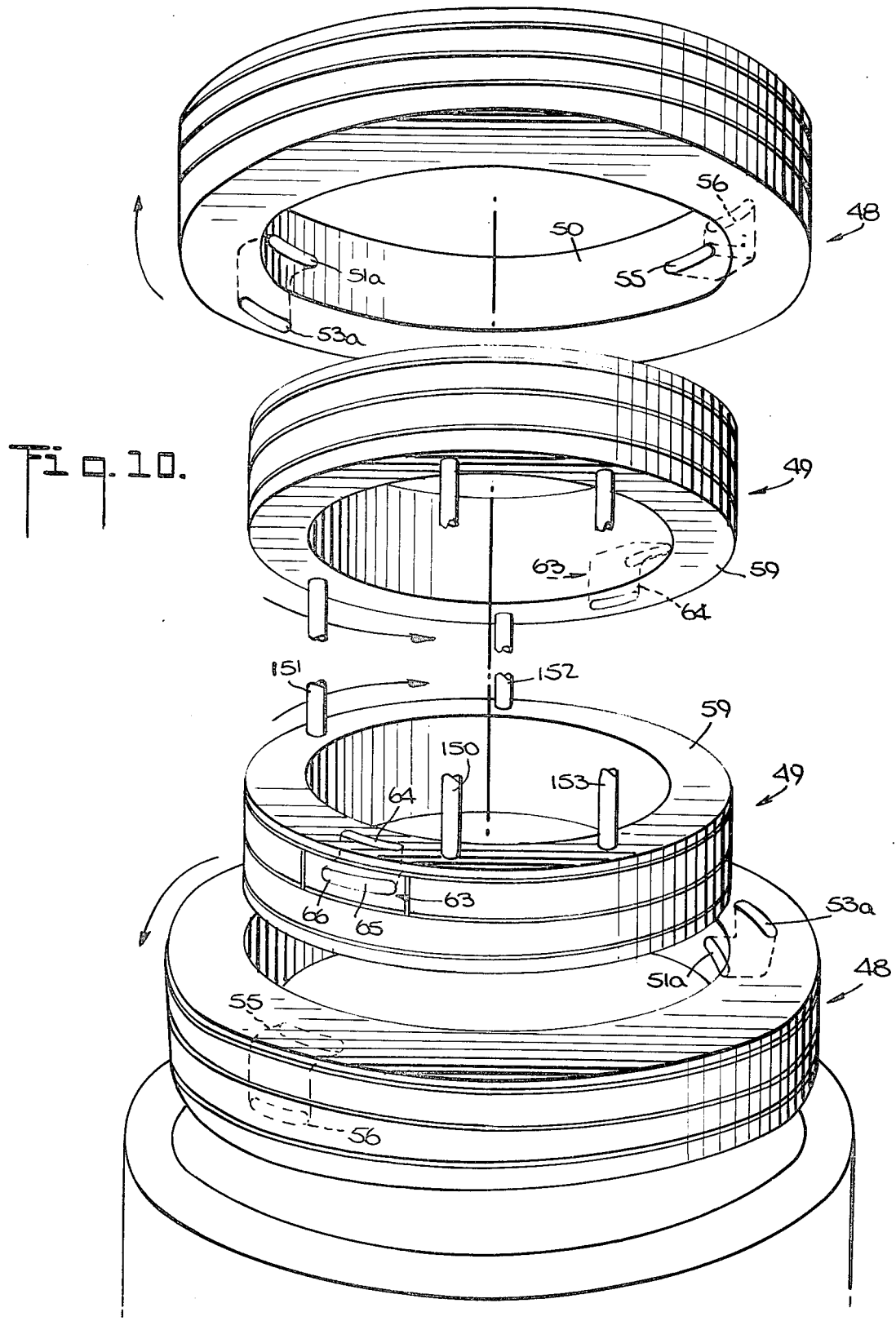
FIG. 10 is a perspective view of oppositely disposed inner and outer valving ring assemblies.

As shown in FIG. 6A, engine 19 includes a central drive shaft 45 centrally disposed within the annular housing 20. Also included are end assemblies 46 and 47, respectively. Each of the end assemblies is disposed adjacent a different end of the annular housing 20. Each end assembly 46 or 47 includes an outer ring assembly 48 and an inner ring assembly 49, as also shown in FIG. 10. The inner ring assembly 49 is surrounded by the outer ring assembly and is rotatable with respect to the outer ring assembly 48. Each outer ring assembly includes an outer valving ring 50, having an exhaust duct 51 originating at an exhaust orifice 51a in the interior cylindrical surface of the outer valving ring, a radially outward duct segment 52, and a longitudinal duct segment 53 directed towards the annular housing 20 and terminating at an exhaust aperture 53a in the inner base surface of the outer valving ring. The outer valving ring 50 also includes an intake duct 56 with a radially outward duct segment 55 originating at the inner base surface.

The outer ring assembly 48 also includes an outer drive ring 57 coupled to the outer valving ring 50 and having an internal geared portion 58. As shown in FIGS. 6A, 6B, 11, and 12, the inner ring assembly includes an inner valving ring 59 and an inner drive ring 60. The inner drive ring 60 has an externally geared portion 60a and is coupled to the inner valving ring 59. The coupling may be achieved by the use of a capscrew 61. A base portion 62 of the inner valving ring is in sliding contact with a portion of the annular housing 20. The periphery of the inner valving ring 59 is in rotatable contact with the outer ring assembly 48. The inner valving ring includes intake-exhaust duct 63 having a longitudinal segment 64 in communication with the interior of the annular housing 20, and a radially outward duct segment 65 with an aperture 66 in the inner ring assembly-outer ring assembly interface 67. The position of the radially outward duct segment 65 of the inner ring assembly 49 is such that, at a desired arrangement of the inner and outer ring assemblies, the aperture 66 coincides with the exhaust duct 51a or alternatively the intake duct 56 of the outer ring assembly at the inlet to radial duct segment 55.

The inner ring assemblies 49 are constrained to one another by four bolts 150, 151, 152 and 153 which traverse the ring assemblies and are tensioned by means such as bolts. Disposed longitudinally adjacent to the valving assemblies are two end plate members 68, each of which has a ring portion 69 and a base portion 70. The opposing end plate members 68 are secured to each other by a plurality of bolts 68a. It should be noted that even though the end plate members are secured to each other, these members do not compress the valving assemblies which ride on seals provided between the end plate members and the valving assemblies. The valving rings are kept in place by the four bolts 150, 151, 152 and 153 described above, which compress the valving assembly to prevent the escape of products of combustion. The base portion is of substantially the same diameter as the outer diameter of the outer ring assembly 48. A hub 71 located interior of and in sliding contact with the inner ring assembly 49 is mounted on end plate member 68. Axial restraining spacer 72, interiorly disposed in the annular chamber 20 is mounted on hub 71.

The hub 71 further includes an interior track 94, which includes three substantially straight track segments 95, 96 and 97, disposed substantially in the form of an equilateral triangle (FIG. 8). Each adjacent track segment is joined at indented junctions 98, 99 and 100 which are radially disposed towards the center of the hub 71. The indented junctions 98, 99 and 100 form a smooth surface 101 on the portion of the track proximate to the center of the hub 71 and sharp points 102 on the portion of the track distal to the center of the hub 71. The hub 71 is attached to the end plate member 68 by means of four bolts 71a, 71b, 71c and 71d, as shown in FIGS. 6A, 6B and 12.

Figure 11:
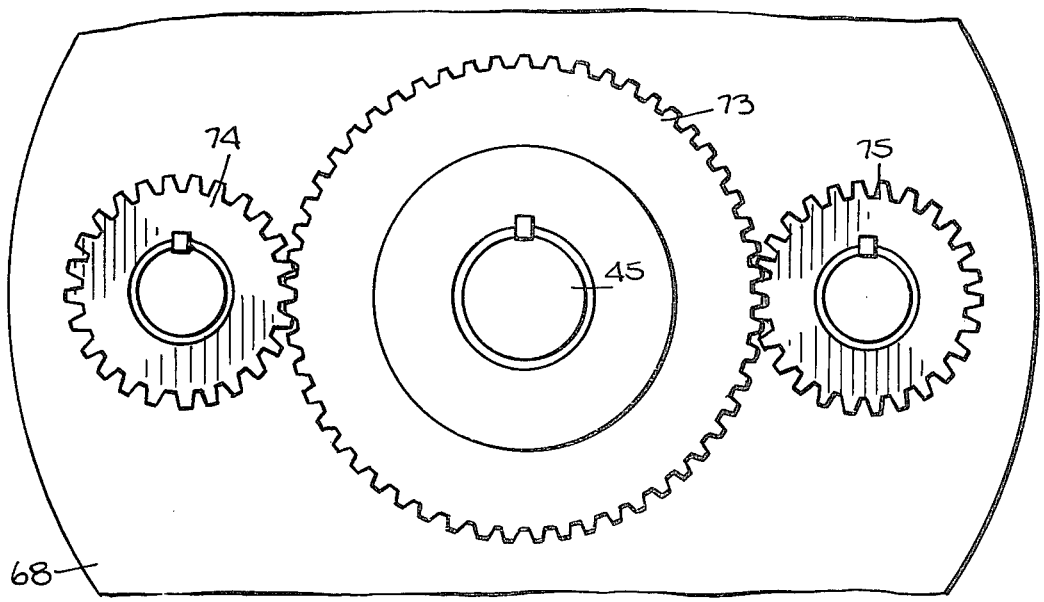
FIG. 11 is an elevational view of external gears for rotating the valving assemblies.
Figure 12:
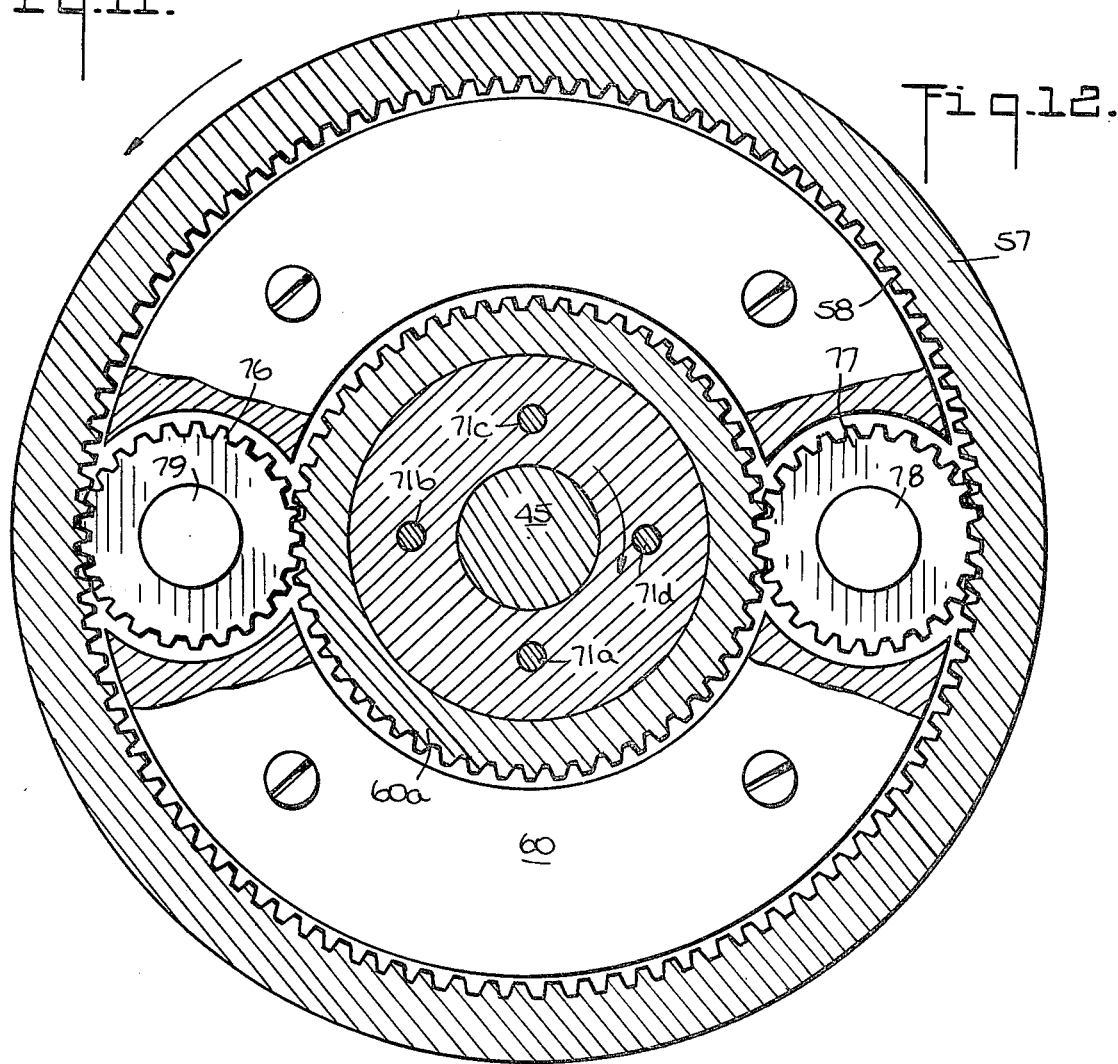
FIG. 12 is a vertical cross section view of gears for driving the valving ring assemblies.

As shown in FIGS. 11 and 12 a gear 73, disposed adjacent to the exterior face of plate member 68, is rigidly secured to the central drive shaft 45. The gear 73 engages two secondary external gears 74 and 75 which are coupled to two secondary internal gears 76 and 77 by means of shafts 79 and 78 respectively. The secondary internal gears engage the internally geared portion 58 of the outer drive ring 57 and the externally geared portion 60a of the inner drive ring 60. Thus as the drive shaft turns clockwise as viewed in FIGS. 11 and 12, the inner ring assembly will turn clockwise and the outer ring assembly will turn counter-clockwise. The sizes of gear 73, secondary gears 74, 75, 76 and 77, the internally geared portion 58 of the outer drive ring 57 and the externally geared portion 60a of the inner drive ring 60 are selected so that the inner drive ring assembly 48 rotates with the central drive shaft 45, and the outer ring assembly rotates opposite to the central drive shaft and at half the rate.

The annular housing 20 and inner and outer valve assemblies 48 and 49 are further restrained and protected by an exterior housing 80. The exterior housing includes three ducts 81 (FIG. 6A), 82 and 83 (shown in FIG. 14) in communication with the duct segments 30, 31 and 32 in the annular housing 20 to provide venting of the exhaust. Seals 80a and 48a are provided between the annular housing 20 and the exterior housing 80 and at each longitudinal end of the outer ring assembly 48. The inner ring 49 is provided with an annular seal 49a where it meets the housing 20.

FIG. 7 shows the rotary engine in the firing position. An ignition cavity 34 located in the housing 20 is designed to coincide with the intake-exhaust duct 63. The ignition cavity 34 can incorporate ignition means such as a spark plug or in a fuel injection embodiment, a fuel injection device. Ignition occurs in the intake exhaust-duct 63 which also serves as a firing chamber. In the firing position, the intake exhaust duct 63 is outside the pumping chamber and covered by the housing 20. As ignition occurs, the pistons 39 and 40 move as does the inner ring assembly 49, thereby gradually uncovering the intake exhaust duct 63, to transfer the ignited pressured mixture into the pumping chamber.

As shown in FIG. 8, the movement of the sliding pistons 39 and 40 within the annular housing 20 is controlled by a pair of lateral roller followers 84 and 85, and central roller followers 86. The central roller followers 86 are in rolling contact with triangular cams 87. Triangular cams 87 each includes three substantially linear cam surfaces 88, 89 and 90 disposed substantially in the form of an equilateral triangle. Each adjacent pair of cam surfaces intersect at rounded corners 91, 92 and 93, thereby providing a smooth cam surface. Each central roller follower 86 is placed in rolling contact within an interior track 94, thus providing a radial restraint on the movement of the sliding piston. The lateral roller followers prevent angular or rocking motion of the sliding pistons 39 and serve to maintain the trailing edge 44 and the leading edge 43 in contact with the internal walls. The lateral roller followers are disposed at the center of curvature of the leading edge and trailing edge of the pistons 43 and 44 respectively. The lateral roller followers engage the cam track 94 and restrain the rocking motion of the pistons.

As shown in FIG. 7, the contour of the triangular cam 87 extends equally spaced from the interior surface of the housing and is fixed in relation to the housing 20, and enables the central shaft to rotate through bushing means not shown. The triangular cam 87 is rigidly secured to restraining member 72 which is in turn attached to hub 71 and face plate member 68. The coupling of the triangular cam to the face plate member enables the triangular cam to remain stationary while the central drive shaft 45 is revolving.

In order to transmit torque to the central drive shaft 45, each piston is coupled to a socket 105 equally spaced about the drive shaft. Each of the sockets contains a bore 106 extending through the socket in a direction substantially tangential to the drive shaft. A connecting rod 107 is pivotally connected to each of the sliding pistons by rod ends 108 (FIGS. 1 and 2). Thus, each rod end 108 rotatably engages a shaft 109 extending through this sliding piston. The connecting rods 107 may be pivotally coupled to either the leading or the trailing edge of the respective sliding pistons as determined by the direction of rotation of the drive shaft. As shown in FIG. 2, connecting rods 107 are pivotally connected to the trailing edge of each piston 39. The end of each connecting rod opposite to its pivotal coupling to the respective sliding pistons is slidably engaged with bore 106 in socket 105 of the drive shaft. Accordingly, while the movement of each sliding piston 39 and 40 within the housing 20 is controlled by cam tracks 95 and triangular cam 90, the connecting rods and socket position keep the sliding pistons circumferentially apart from one another and allow the pistons to transmit torque to the drive shaft.

Figure 5:
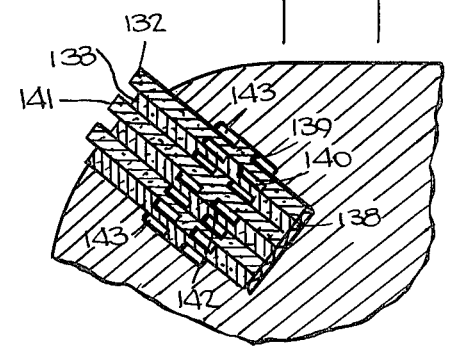
FIG. 5 is a fragmentary cross section view of a piston showing a plurality of end seals.

In order to seal the leading edge 43 and the trailing edge 44 of a sliding piston with respect to inner walls 21, 22 and 23 of the housing to withstand combustion pressures, there are provided a plurality of strip-like seal assemblies 130 shown in FIGS. 3, 4 and 5 internally disposed on a recess 131 formed at the leading and trailing edges of the piston 43 and 44 respectively. The seal assemblies can comprise a plurality of strips 132 and 133 of a suitable seal material whether metallic, carbon, or the like. The seal assemblies can also prevent the presence or entrance of oil into the chambers found adjacent to the rounded corners of the housing. Thus, the seals accomplish the functions of compression seals and oil seals. As shown in FIGS. 4 and 5 strips 132 are adapted to extend outwardly with respect to strips 133. Strips 132 and 133 can be of disequal lengths in order to stagger the function of one strip to another. In order to bias either strips 132 or 133 toward the base portion 62 of the inner valving ring 59, crescent-shaped springs (not shown) are disposed in recesses at adjacent ends 104a and 105a of either strips 132 or 133. The crescent shaped spring will exert a force on strips 132 and 133 laterally so that they can contact the base portion of the inner valving ring 59. The integrity of the seal can be controlled by the stiffness of the wave of the spring.

A wave spring 138 is disposed at the bottom of the recess 131 of each piston. This wave spring 138 will bias strips 132 and 133 outwardly in order to effect contact with the walls 21, 22 and 23 of the housing 20. The strips 132 and 133 are formed to have a raised portion 139 on one side and an indented portion 140 on the other. A central strip member 141 having a raised portion 142 at either side is centrally disposed in the recess 131 of each edge of the piston. Each recess 131 is formed so as to accommodate the strips and having indented portions 143 at either end. The indented portions 143 of the recess 131 are sized to accommodate the raised portion 139 of a strip and allow a predetermined amount of travel. The coupling of the indented portion of the recess 143 with the raised portion of the strip 139 restrain the strips within the recess 131.

In addition to the seals in the piston, the engine 20 requires seals 160 in the interface between the rotating parts. Specifically, as seen in FIG. 6A seals must be provided between the inner ring 59 and the piston 29; between the outer valve assembly 49 and the annular housing 20; between the inner valving assembly 48 and the outer valving assembly 49; and between the inner valving assembly 48 and the hub 71. These seals must be capable of reducing friction between the sliding surfaces and maintaining a pressure-tight fit. Lubrication is provided to the sliding surfaces by conventional means. Seals 160 are also incorporated on the end portions of the annular housing 20. As shown in FIG. 1, the end face of the annular housing is provided with grooves 161, 162, 163, 164 for the insertion of the seals.

Figure 13A:
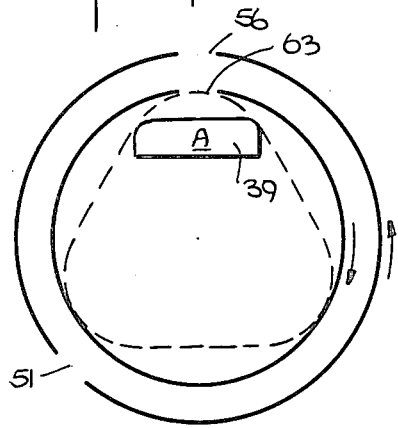
FIGS. 13 A-L show schematic representations of the sequential positions of the bottom valving assemblies and the pistons.

FIGS. 13A through L show the operation of the engine of the invention. In FIG. 13A looking from the bottom ring assembly 41, piston A is shown in the charge position while piston B (not shown) is in the firing position. The bottom intake opening 54a and the intake duct 54 are aligned with the inner ring assembly intake exhaust duct 63 and orifice 63a. At that time, a fuel and air mixture is injected into the chamber 112 formed by the sliding piston and the rounded corner 24. The intake position of the rings is shown in FIG. 6B, with arrows showing the direction of the flow.

Figure 13B:
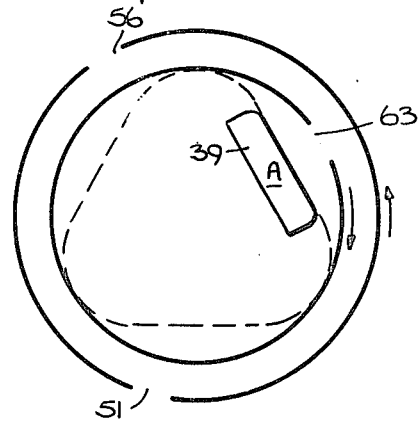

As the pistons rotate due to the torque generated by the combustion of the charge, piston A moves through approximately a 60° arc to the position shown in FIG. 13B, where maximum compression and firing occur in the intake exhaust duct 63 and where piston B takes in a charge through the top ring assembly 46. The relative positions of the rings and the housing at ignition is shown in FIG. 7, where the intake exhaust duct 63 is closed off by the outer ring and is put in communication with the ignition cavity 34.

Figure 13C:
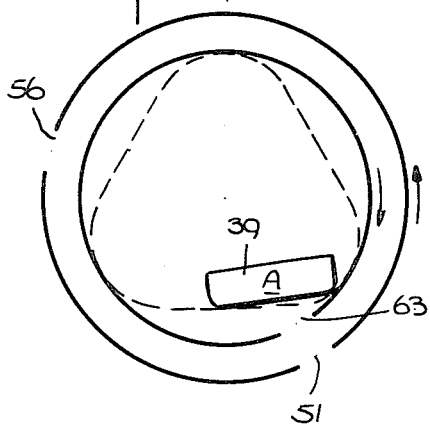
Figure 13D:
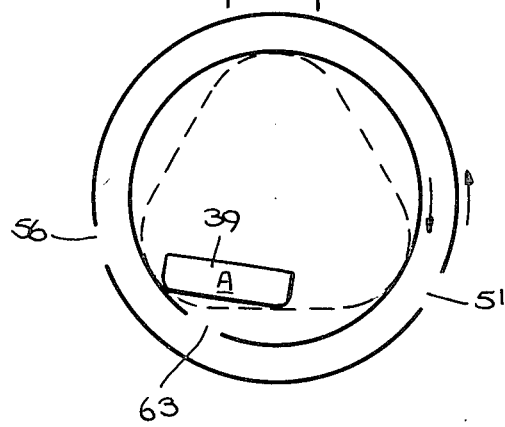

Piston A continues its travel reaching maximum expansion after it has rotated approximately 120°, and then begins the exhaust stroke shown in FIG. 13C. There the intake exhaust duct 63 is aligned with the exhaust duct 51 when the piston A has rotated approximately 150°. The relative positions of the rings at the exhaust position is shown in FIG. 6A. The intake exhaust duct of the top inner ring is put in communication with the exhaust duct of the outer ring and with the longitudinal ducts of the housing. The flow of the exhaust is shown by arrows. Piston A continues its rotation and begins a new intake stroke, as shown in FIG. 13D this occurs after approximately a 240° rotation from the original position shown in FIG. 13A.

FIGS. 13A through 13L show the relative rotation of one of the inner valving assemblies with respect to the associated outer valving assembly. Beginning with FIG. 13A, the intake exhaust duct of the inner valving assembly 49 is shown aligned with the intake duct 24 of the outer valving assembly 48. The inner valving assembly and the pistons will rotate through approximately 150° clockwise to reach the position depicted on FIG. 13B, while the outer valving ring will rotate counterclockwise a total of approximately 75°. At the position depicted in FIG. 13C, piston A is in the exhaust position and the intake exhaust duct of the inner valving assembly is aligned to the exhaust duct of the outer valving assembly. The pistons within the inner valving assembly will then rotate through an arc of approximately 90° clockwise, while the outer ring assembly rotates counter-clockwise approximately 45° thereby reaching the position depicted in FIG. 13D which is another intake stroke.

Figure 13E:
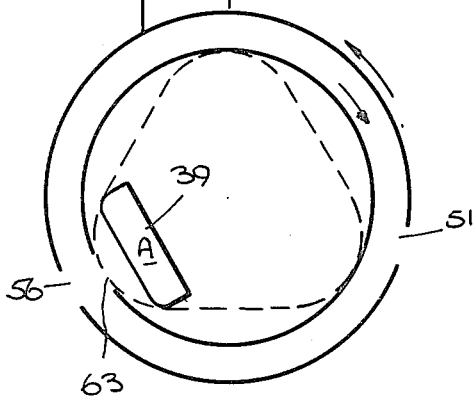
Figure 13F:
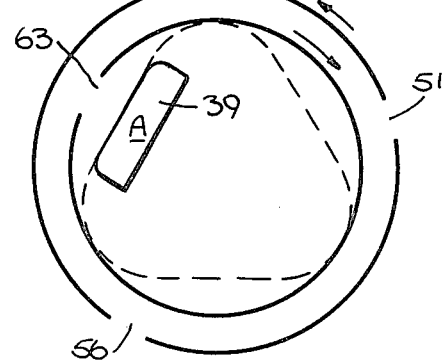
Figure 13G:
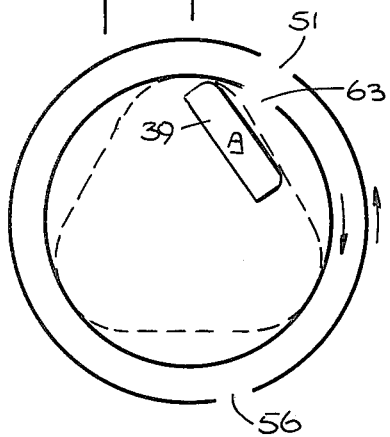
Figure 13H:
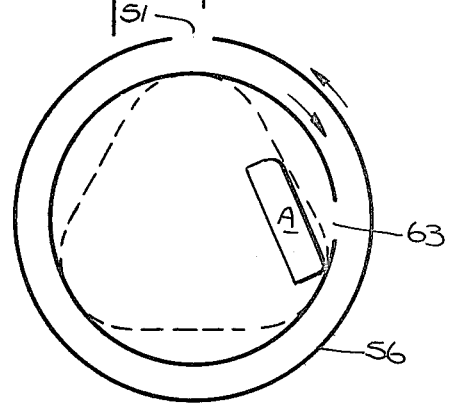
Figure 13I:
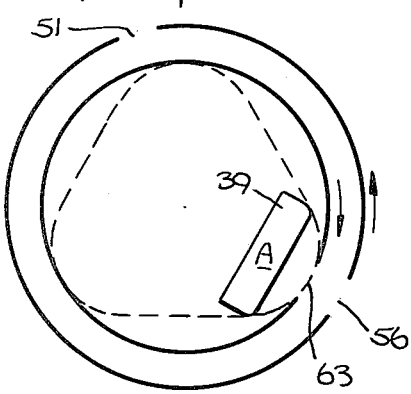
Figure 13J:
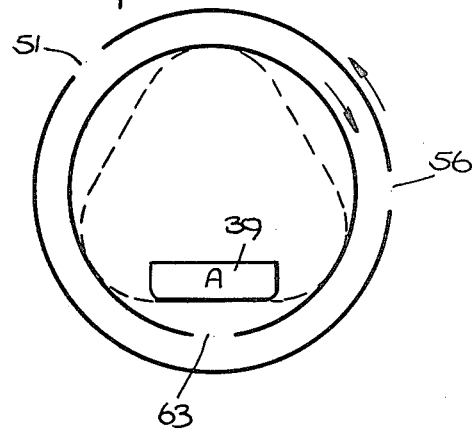
Figure 13K:
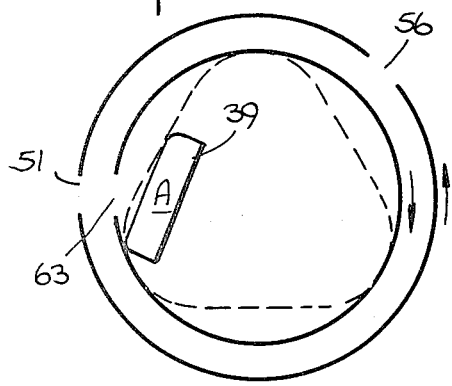
Figure 13L:
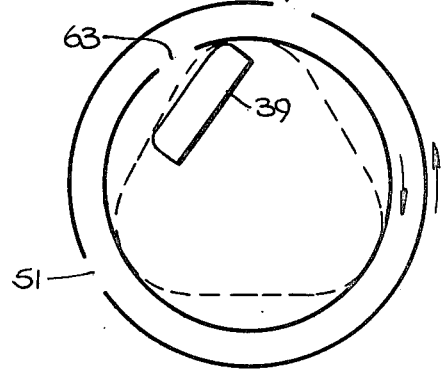

After a piston rotation of approximately 150° and an outer valving assembly rotation of approximately 75° counter-clockwise, the bottom assembly reaches the exhaust position depicted in FIG. 13E. A piston rotation of approximately 90° and an outer valving assembly rotation of approximately 45° counter-clockwise will take the system to the position depicted in FIG. 13F, another intake stroke. The pistons then rotate through approximately 150° clockwise arc, while the outer valving assembly rotates approximately 75° counter-clockwise and the ducts again coincide as shown in FIG. 13G in another exhaust stroke. An additional piston rotation of approximately 90° will take the system back to the position depicted in FIG. 13A.

In FIG. 13A, the annular housing 20 is oriented so that one of the rounded corners 24 is at 0° or the 12 o'clock position. The inner ring assembly 49 and the outer ring assembly 48 are initially disposed so that the intake-exhaust duct 63 and the intake duct 54 are both at 0° thereby enabling communication between the ducts.

The exhaust duct 51 is disposed at, approximately 145° counterclockwise with respect to the intake duct 54. The pistons 39 and 40 and inner ring assembly 49 rotate clockwise at the same rate as the pistons 39 and 40 and the outer ring assembly 48 rotates counter-clockwise at half the rate of the pistons.

From FIG. 13 it can be seen that for piston A's intake to occur at approximately 0°, the initial position an exhaust cycle occurs at approximately 150° after the outer ring has rotated approximately 75° counterclockwise. Another intake cycle occurs at approximately 240°, the outer ring having rotated approximately 120° counter-clockwise from its origin; an exhaust cycle occurs at approximately 390° (30°), after an outer ring counterclockwise rotation of approximately 195°. An intake cycle occurs at after a piston rotation of approximately 480° and an outer ring rotation of approximately 240°. An exhaust cycle occurs after a piston rotation of approximately 630°, etc. This results in an intake cycle for piston A at 0°, 240°, 120° and an exhaust cycle at approximately 150°, 30°, and 270°. Piston B follows the same pattern but is off-set by approximately 240°.

Figure 6:
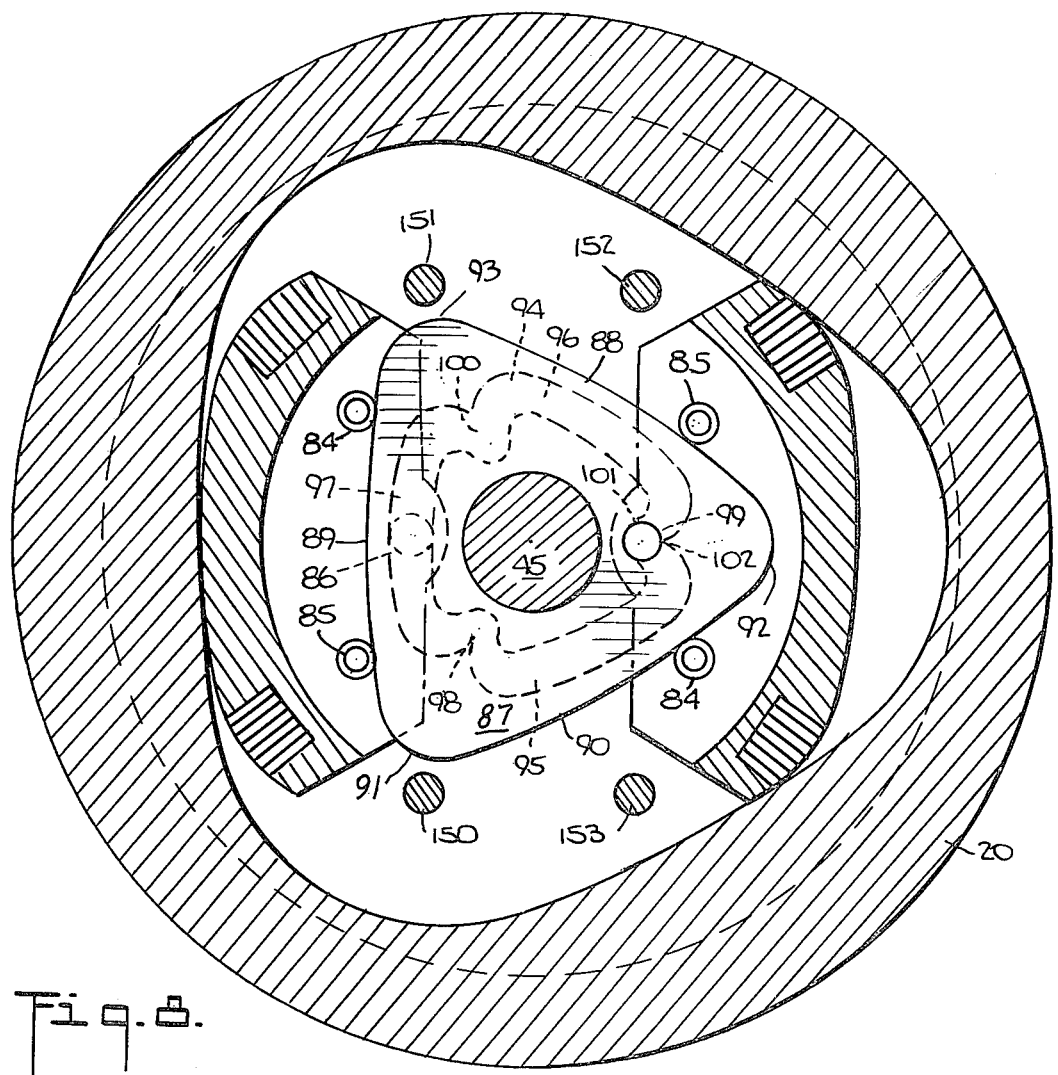
Figure 9:
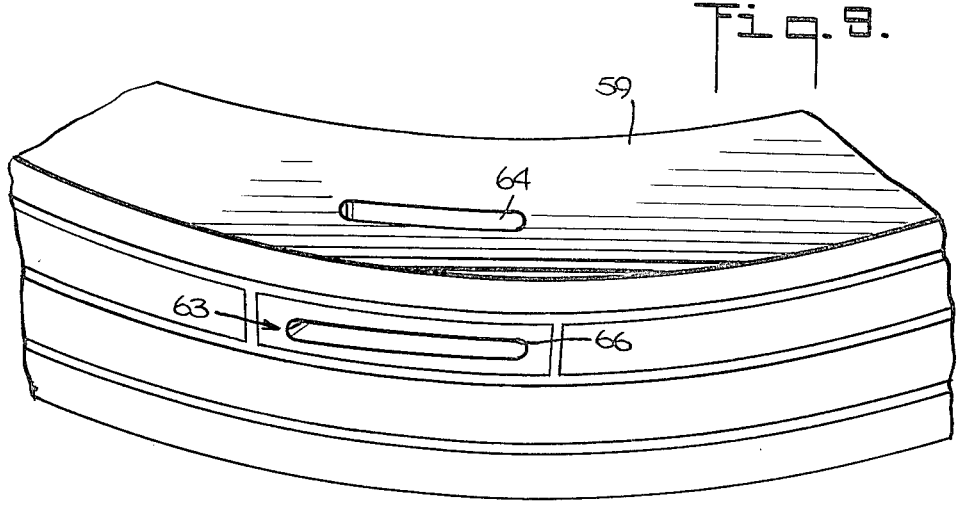
FIG. 9 is a fragmentary perspective side view of an inner valving ring with flow passages therein.

FIGS. 13A, 13B and 13C in conjunction with FIGS. 6 and 7 help to illustrate a brief summary of the operation of the engine of the invention. In FIG. 13A the piston and the ring assembly are shown at the intake position. This intake position is also shown in FIG. 6 where the arrows indicate the flow of the fuel air mixture, or in the case of fuel injection, just air. In FIG. 6 the inner valving assembly and the outer valving assembly coincide to form the passage through which intake takes place.

As the piston advances it compresses the air or fuel air mixture into the intake exhaust duct 63 where firing takes place. This is shown in FIG. 7 and it should be noted that combustion takes place in the intake exhaust duct 63.

Piston A then goes through an expansion cycle and finally reaches the position shown in FIG. 13C where exhaust occurs. The valving assembly position in the exhaust stroke is shown in FIG. 6 in the upper left hand side of the drawing. The arrows depict the flow path of the exhaust. As described in detail above the piston then begins a new cycle.

FIG. 14 is a perspective exterior view of the engine 19 showing pipes leading to the intake manifolds and exhaust pipes. Also shown in FIG. 14 are the three pairs of ignition cavities 34, 35 and 36.

In another embodiment of the invention, shown in FIG. 15, an engine 69 comprises an annular housing 20a with six internal walls 71, 72, 73, 72b, 72a and 72c, disposed substantially as an equilateral hexagon (equiangularly, i.e., the angle formed by adjacent walls is the same). Each adjacent pair of walls intersect at junctions or rounded corners 74, 75, 76, 74a, 75a and 76a. Disposed within the annular housing 70 are four sliding pistons 79, 79a, 80 and 80a. These pistons are as described in the previous embodiment. Each rounded corner in the engine shown in 16 serves only a single function, i.e., an intake chamber or an expansion chamber, unlike the triangular configuration in which the rounded corners each served for both functions.

The engine 69 also includes a valving assembly 86 comprising an inner 88 ring assembly and an outer ring assembly 89. The inner ring assembly is fixed to the central drive shaft 85 and rotates with the drive shaft. The inner ring assembly 88 includes four intake exhaust ducts 93a, 93b, 93c, 93d, each as described in the previous embodiment. Also included in the engine is a fixed outer valving ring assembly 89 which may be fixed to the annular housing 70. The outer valving ring has three intake ducts 94a, 94b and 94c, and three exhaust ducts 91b, 91c and 91d. These intake and exhaust ducts are constructed in the same manner as in the above described embodiment.

The annular housing 70 is provided with three ignition cavities 104a, 104b, 104c, as described above. The intake-exhaust ducts 93a, 93b, 93c and 93d are disposed at approximately 90° intervals in the inner ring assembly. The intake ducts are located at approximately 120° intervals, with the exhaust ducts displaced approximately 30° from the intake ducts. In this configuration each sliding piston undergoes three cycles per revolution.

It should be noted that an engine having an even number of walls, say 2N, the number of ignition cavities should be N, as should the number of exhaust and intake ducts. The number of intake exhaust ducts will equal the number of pistons used.

The device described above can also be used as a compressor or motor when minor modifications are made.

For example, the device in FIG. 1 can be used as a compressor or a motor. When used as a compressor, torque from an outside source is imparted on the central shaft. The rounded corners act as intake chambers and the fluid is compressed into the intake exhaust duct of the inner valving ring. In this situation the outer valving ring is stationary and provided with the intake ports that are disposed under the rounded corners and three exhaust ports disposed below the midpoint of each wall. The fluid enters at relatively low pressure say ambient, when the piston straddles two adjacent walls. As the piston slides due to the torque on the central shaft the fluid is compressed into the intake exhaust duct of the inner valving ring and then exhausted into a high pressure reservoir through the appropriate exhaust port. The cycle repeats again for the piston as it nears the adjacent rounded corner.

In the case of a motor, high pressure fluid is injected into the intake exhaust duct of the inner valving ring when the sliding piston is tangent to one of the walls. The high pressure causes the piston to slide and the piston forms an expansion chamber as it approaches a rounded corner. The fluid is exhausted prior to the piston being tangent with the adjacent wall, and the cycle begins again.

It is understood that these principles work with any number of walls and pistons and that the scope of this disclosure is intended to cover the possible combinations of walls, pistons and valving rings.

What is claimed is:

1. In a rotary internal combustion engine having:
   an annular housing with oppositely disposed end surfaces and at least two inner walls forming a housing cavity within the housing, the inner walls being equiangularly disposed about the longitudinal axis of the annular housing with the inner walls adjacent one another intersecting in rounded corner portions;
   a drive shaft disposed within the housing cavity with the axis of the shaft extending along the longitudinal axis of the annular housing;
   at least one rotary sliding piston disposed within the housing cavity and having a face portion adjacent an inner wall of the housing, the face portion having a leading edge and a trailing edge and having two oppositely disposed side portions extending from the face portion, the face portion being of a predetermined length in relation to the inner walls of the annular housing to enable the leading edge and the trailing edge of the piston to maintain sliding contact with adjacent inner walls, the piston having a width substantially the same as the width of the annular housing in the direction of the longitudinal axis thereof,
   means disposed at each of the opposite ends of the housing adjacent the end surface thereof and extending across the housing cavity adjacent each side portion of a piston for closing the housing cavity between the face portion of the piston and the inner walls of the annular housing, the piston being adapted to be driven with a rotary and sliding motion with respect to the inner walls of the housing by the expansion of pressured products of combustion between the face portion of the piston and an inner wall of the housing;
   means disposed within the annular housing for connecting the piston to the drive shaft;
   means disposed within the annular housing for guiding each piston in the rotary and sliding motion thereof to rotate with respect to the central axis of the housing and to slide with respect to the inner walls of the housing, the guiding means positioning the end portions of the face portion of the piston adjacent intersecting inner walls of the housing when the face portion of the piston is adjacent the corner therebetween to form alternately an intake chamber and an expansion chamber, the guiding means positioning the face portion of the piston to be substantially contiguous with an inner wall of the housing and the end portions of the face portion to be adjacent the corner portions of the inner wall to which the face portion is contiguous to compress alternately a charge between the face portion of the piston and the inner wall and to discharge alternately exhaust products from between the face portion and the inner wall;
   the improvement comprising:
   at least one of the means disposed adjacent an end surface of the housing for closing the housing cavity between the face portion of a piston and the inner walls of the annular housing including:
   (a) a valving assembly having at least one rotatable inner valving ring adapted to rotate about the longitudinal axis of the annular housing, the inner valving ring having
      (i) a surface portion exposed to the housing cavity adjacent a side portion of a piston and the inner wall of the housing,
      (ii) at least one intake-exhaust duct for one of the pistons disposed in the inner valving ring and having a housing cavity orifice on the surface portion and an intake-exhaust orifice at the end of the intake-exhaust orifice, the number of intake-exhaust ducts in all inner valving rings corresponding to the number of pistons or a multiple thereof, the housing cavity orifice being disposed at a predetermined radius with respect to the center of the inner valving ring to enable the housing cavity orifice to be in communication with the housing cavity when the housing cavity orifice is rotated to adjacent a rounded corner of the annular housing and to enable the housing cavity orifice to be covered by the side portion of a piston when the housing cavity orifice is rotated to between rounded corners of the annular housing, the intake-exhaust orifice being rotated to one location when the housing cavity orifice is in communication with an intake chamber formed in the housing cavity for delivery of an intake charge thereto and being rotated to another location when the housing cavity orifice is in communication with an expansion chamber formed in the housing cavity for delivery of an exhaust charge therefrom, and (iii) means disposed adjacent the rotary path of travel of the intake-exhaust orifice for closing the intake-exhaust orifice through a portion of the rotary path of travel thereof and for opening the intake-exhaust orifice when rotated to the one and another locations thereof; and (b) means coupled to the drive shaft for rotating the inner valving ring in synchronism with the rotation of the piston.

2. The improvement of claim 1 further comprising:
end plate members disposed adjacent each means for closing and including bushing means for supporting said drive shaft in a freely rotatable mode;
means for securing the end plate members to each other;
means in communication with the intake chamber for delivering fuel to the intake-exhaust duct;
means in communication with the expansion chamber for exhausting products of combustion.

3. In the improvement of claim 2, said means for closing the intake-exhaust orifice comprising:
means disposed in sliding pressure tight contact with the inner valving ring for valving the intake-exhaust orifice, the means for valving having a contact surface in contact with the inner valving ring, and including at least one intake duct originating in the contact surface and terminating in the exterior of the means for valving, and at least one exhaust duct originating in the contact surface and terminating in the exterior of the means for valving, the points of origin of the duct and the exhaust duct being disposed on the contact surface along the same plane as the intake-exhaust orifice of the inner valving ring, the means for valving being first adapted to have the intake duct in alignment and in communication with the intake-exhaust duct, then to cover the intake-exhaust orifice as the inner valving ring rotates, and thereafter to have the exhaust duct in alignment and in communication with the intake-exhaust duct as the inner valving ring is further rotated, the means for valving, the first end of the annular housing, and the intake-exhaust completing a combustion chamber within the inner valving ring.

4. The improvement of claim 3 further comprising the annular housing having at least one ignition cavity disposed therein, the ignition cavity having an orifice disposed adjacent an end surface of the annular housing between rounded corner positions thereof; and means in synchronism with the rotation of the pistons and disposed in each ignition cavity for igniting the fuel air charge in the combustion chamber.

5. The improvement claim 4 wherein said means for delivering fuel to the combustion chamber comprises delivering a fuel air mixture to the intake duct.

6. The improvement claim 4 wherein said means for delivering fuel comprises fuel injection through the ignition cavities.

7. The improvement in accordance with claim 1 in which the means disposed within the annular housing and responsive to pressure of products of combustion in an expansion chamber for guiding the pistons to rotate with respect to the central axis of the annular housing and to slide with respect to the inner walls of the annular housing with the end portions of the pistons being adjacent intersecting inner walls of the housing when the piston is adjacent thereto comprises:

a cam disposed in the cavity of the annular housing and having a predetermined plurality of substantially outwardly facing planar cam surfaces equiangularly extending about the central axis with each adjacent pair of surfaces forming substantially rounded corners, the predetermined plurality corresponding in number to the number of inner walls of the annular housing and having the cam surfaces in engagement with the inner portion of each piston disposed opposite the face portion thereof;

a face cam being disposed at each of the opposite ends of the cavity adjacent an end surface of said annular housing assembly and extending substantially at right angles to the central axis, each face cam having a cam track including a predetermined plurality of equiangularly disposed track segments, each track segment having a substantially straight middle portion and two substantially rounded end portions curving towards the center of the face cam, each adjacent end portion intersecting in a substantially sharp point at the outer cam track surface and in a substantially rounded segment at the inner cam track surface, the predetermined plurality of track segments corresponding in number to the number of inner walls of the annular housing and being in engagement with the inner portion of each piston disposed opposite the face portion thereof.

8. The improvement of claim 7 in which the means for engaging a piston to the cam comprises at least one roller follower mounted on the piston and adapted to engage the cam.

9. The improvement of claim 8 in which the means for engaging a piston to the cam track comprises two roller followers mounted at the center of curvature of the leading edge of the piston and the center of curvature of the trailing edge of the piston, the roller followers being adapted to engage the cam track.

10. The improvement of claim 1 further comprising:
2N inner walls in said annular housing;
N ignition cavities equiangularly disposed on said annular housing;
N intake ducts equiangularly disposed on said means for valving; and
N exhaust ducts equiangularly disposed on said means for valving.

11. The improvement of claim 1 further comprising:
six inner walls in said housing;
four rotary sliding pistons;

three ignition cavities equiangularly disposed on said annular housing;

three intake ducts equiangularly disposed on said means for valving;

three exhaust ducts equiangularly disposed on said means for valving;

four intake exhaust ducts equiangularly disposed on said valving ring; and said means for closing being a flat plate secured to the second end of said housing.

12. The improvement of claim 1 wherein said means for valving the intake-exhaust orifice comprises:

an outer ring having an inner cylindrical surface in sliding, pressure tight contact with the outer surface of said inner valving ring, said outer ring having an intake duct terminating in an intake orifice on the inner cylindrical surface, and an exhaust duct angularly spaced from intake duct and terminating in an exhaust orifice on the inner cylindrical surface and at the same longitudinal coordinate as the intake orifice;

the intake-exhaust orifice of said inner valving ring, disposed on the exterior cylindrical surface of the inner valving ring and means for rotating said outer ring at a predetermined rate and in a direction opposite the rotation of the inner valving ring.

13. The improvement of claim 1 wherein both means for closing the housing cavities comprise valving assemblies.

14. The improvement of claim 13 wherein said annular housing has three internal walls and including two rotary sliding pistons.

15. The improvement of claim 14 wherein said means for rotating said outer ring comprises:

a main gear attached to the drive shaft;

two secondary gear assemblies coupled to said main gear; and an internal gear disposed on the outer ring and coupled to the secondary gear assembly.

16. The improvement of claim 15 wherein each of said secondary gear assemblies comprises:

an outer secondary gear adjacent to one of said endplates and coupled to the main gear;

a longitudinal rotating shaft traversing the end plate and connected to the outer secondary gear; and an inner secondary gear attached to the longitudinal rotating shaft and coupled to the internal gear of the outer ring.

17. The improvement of claim 16 in which the means for rotating the inner valving ring comprises an exteriorly disposed gear disposed on the inner ring assembly and coupled to the inner secondary gears.

18. A rotary compressor comprising:

an annular housing having at least two walls equiangularly disposed about a central axis with adjacent walls intersecting in rounded corners;

two end assemblies each disposed at opposite ends of said annular housing and fixed thereto in pressure tight fashion;

at least one sliding piston having a face portion with a leading edge and a trailing edge and two side portions, the leading edge and trailing edge of said piston being in contact with the walls in said housing at all times and said piston in conjunction with the walls and the end assemblies forming a chamber adapted for use as a pumping chamber when the face portion of said piston is substantially tangent with one of the walls of said housing;

at least one rotating valving assembly disposed within one of said end assemblies and adjacent to an end of said annular housing, said valving assembly having at least one duct for delivering fluids at relatively low pressures, exhausting fluids at high pressure from the pumping chamber, and serving as a compression chamber in a predetermined cycle;

shaft means mechanically coupled to said sliding piston for moving said sliding piston in response to rotation of said shaft means; and means for maintaining the leading edge and trailing edge of said piston in contact with at least one wall of said annular housing, as said pistons rotate in response to rotation of said shaft means whereby the piston cyclically takes a charge of fluid at a relatively low pressure, compresses the fluid into the compression chamber in said valving assembly and discharges the fluid at a higher pressure.

19. A rotary motor for converting energy stored in a source of high pressure fluid to rotating motion, the motor comprising:

an annular housing having at least two walls equiangularly disposed about a central axis with adjacent walls intersecting in rounded corners;

two end assemblies each disposed at opposite ends of said annular housing and fixed thereto in pressure tight fashion;

at least one sliding piston having a face portion with a leading edge and a trailing edge and two side portions, the leading edge and trailing edge of said piston being in contact with at least one of the walls in said housing at all times and said piston in conjunction with the walls and the end assemblies forming a chamber adapted for use as a high pressure fluid intake chamber when the face portion of said piston is substantially tangent with one of the walls of said housing and as an expansion chamber when the leading edge of said piston is in contact with one wall and the trailing edge is in contact with an adjacent wall;

shaft means mechancially coupled to said sliding piston for producing rotating motion responsive to a sliding motion of said sliding piston;

at least one rotating valving assembly disposed within one of said end assemblies and adjacent to an end of said annular housing, said valving assembly having at least one duct for delivering fluids at high pressure from said source and exhausting fluids at relatively low pressures from said expansion chamber during a predetermined cycle;

means for maintaining the leading edge and trailing edge of said piston in contact with at least one wall of said annular housing as said piston slides due to the expansion of said high pressure fluid, whereby the piston cyclically takes a charge of fluid at relatively high pressure, expands the fluid in said expansion chamber in said valving assembly and discharges the fluid through said duct in said valving assembly.

* * * * *